(12) United States Patent
Xing et al.

(10) Patent No.: US 6,446,245 B1
(45) Date of Patent: Sep. 3, 2002

(54) METHOD AND APPARATUS FOR PERFORMING POWER ROUTING IN ASIC DESIGN

(75) Inventors: Zhaoyun Xing, San Jose; Russell Kao, Portola Valley, both of CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/477,652

(22) Filed: Jan. 5, 2000

(51) Int. Cl.$^7$ ............................................. G06F 17/50
(52) U.S. Cl. .............................. 716/10; 716/12; 716/8; 716/9; 716/11; 716/13; 716/14
(58) Field of Search ........................... 716/10, 8, 9, 11, 716/12, 13, 14, 2

(56) References Cited

U.S. PATENT DOCUMENTS

| | | | | | |
|---|---|---|---|---|---|
| 4,949,275 A | * | 8/1990 | Nonaka | ........................ | 716/17 |
| 5,598,348 A | * | 1/1997 | Rusu et al. | ...................... | 716/2 |
| 5,623,420 A | * | 4/1997 | Yee et al. | ........................ | 716/1 |
| 5,631,492 A | * | 5/1997 | Ramus et al. | ............... | 257/532 |
| 6,054,872 A | * | 4/2000 | Fudanuki et al. | .............. | 326/39 |
| 6,091,090 A | * | 7/2000 | Gheewala | .................... | 257/211 |

OTHER PUBLICATIONS

Yeh et al, "Layout Technique Supporting the Use of Dual Supply Voltages for Cell–Based Designs," IEEE, Jun. 1999, pp. 62–67.*
Wang et al, "Design of Standard Cell Used in Low–Power ASIC's Exploiting the Multiple–Supply–Voltage Scheme," IEEE, Sep. 1998, pp. 119–223.*
Envisia Silicon Ensemble Place–and–Route [online], [retrieved on May 24, 2000]. Retrieved from the Internet: <URL: p. 1–3, http://4.18.241.156/datasheets/silicon_ensemble.html>.*
Apollo–II Product Information [online], [retrieved on May 24, 2000]. Retrieved from the Internet: <URL: p. 1–3. http://www.avanticorp.com/Avant!/SolutionsProducts/Products/Item/1,1172,5,00.html>.*
Cadence Design Systems [online], [retrieved on May 24, 2000]. Retrieved from the Internet: <URL: http://www.cadence.com/> p. 1.*
Avant!—The Very Deep Submicron Technology Leader [online], [retrieved on Apr. 3, 2000]. Retrieved from the Internet: <URL: http://www.avanticorp.com/> p. 1–2.

* cited by examiner

*Primary Examiner*—Vuthe Siek
(74) *Attorney, Agent, or Firm*—Gunnison, McKay & Hodgson, L.L.P.; Philip J. McKay

(57) ABSTRACT

A method and apparatus for performing power routing in ASIC design. Power routing is performed after cell placement, allowing more knowledgeable placement of power structures in the physical layout. By performing cell placement prior to power routing, standard cells are allowed to be placed in more optimal configurations. In one embodiment, power rings and power straps are placed over the top of the standard cells based on power analysis of the standard cell layout. Those regions of the layout where design violations are triggered are corrected by an incremental placement correction of affected cells. In another embodiment, cells are placed in the physical layout in a bottom-up hierarchical manner. When a given cell becomes large enough to require power routing, a power feed cell of sufficient dimension to support the necessary power strap is inserted into the layout during the placement process. In the subsequent power routing phase, power straps are placed over the power feed cells.

20 Claims, 7 Drawing Sheets

METHOD AND APPARATUS FOR PERFORMING POWER ROUTING IN ASIC DESIGN

BACKGROUND OF THE INVENTION

1. Field of the Invention

The present invention relates generally to the field of integrated circuit design, and, more specifically, to power routing in ASIC design.

Sun, Sun Microsystems, the Sun logo, Java and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

Designers of integrated circuit chips, such as application specific integrated circuits ("ASIC"), typically rely on a computer aided design ("CAD") program using a hardware description language to assist in their design. Hardware description languages allow the designer to specify, in software, the logical operation of the chip they are designing. Typical hardware description languages include Verilog, Synopsys MCL (module compiler language), and Very High Speed Integrated Circuit (VHSIC) Hardware Description Language (VHDL).

Present design processes consist of several steps. First, the designer writes a description of a circuit in the form of a software program describing the flow of signals in the chip and the logical operations performed on those signals. In Verilog, for example, such a program is written at the so-called "Register Transfer Level" ("RTL"). Once the designer has programmed the operation of the logic circuit, the program is simulated and, if acceptable, synthesized into a corresponding collection of standard cells. Standard cells are components, such as logic gates, latches, decoders, and various other components, that exist in a library accessible by a synthesis tool. The synthesis step is typically an automated process in which the synthesis tool determines the appropriate standard cells and interconnections between standard cells to realize a circuit that satisfies the RTL model. At this point, the chip is ready for physical design; that is, the physical placement of the synthesized standard cells and the routing of interconnections (wires) among them. Physical designers typically use automated tools to aid in placement and routing. Once the physical design is complete, process masks are obtained from the generated layout, and those process masks are used in the chip foundry to process the desired integrated circuit from semiconductor materials (e.g., silicon wafers).

Power routing is an important step in the physical design phase of ASIC design. Traditionally, power routing is performed during the floor planning stage, before cell placement. The separation between power routing and cell placement limits the designer's ability to control the power routing according to the cell placement. This is because the locations of the standard cells, and hence the power consumption behavior of the circuit, are not yet known at the power routing stage. This power routing flow also creates obstacles for cell placement optimization, which result in poor placement and lower area utilization (e.g., fewer gates per unit area). Since an accurate power analysis is not possible during the floor planning stage, a conservative power planning strategy must be taken. This conservative strategy also results in lower silicon utilization.

Prior to placing standard cells in a physical layout, power routing operations set up a power ring and power straps, for example, in the vicinity of where standard cells will be placed. A power ring is a power bus that bounds a physical area, whereas a power strap is a power bus that spans a power ring. The power ring and power straps represent obstacles to the placement of standard cells, leading to non-optimized cell placement in many cases. Also, when the power ring and power straps are initially placed in the physical layout, general assumptions are made about how power will be consumed in the circuit. These assumptions may or may not accurately reflect actual power consumption patterns of the placed standard cells. For process technologies above one micron, the power assumptions may prove satisfactory. However, with technology advances in submicron processing regimes leading to smaller, more densely packed circuits, inaccuracies in power distribution have greater negative impact on circuit performance. Further, as low-power designs increase in popularity, efficient power distribution becomes more of an issue in circuit design. By performing power routing before placement of standard cells, current systems are prevented from providing optimized power distribution with reference to actual power use patterns of the final circuit layout.

SUMMARY OF THE INVENTION

A method and apparatus for performing power routing in ASIC design are described. Power routing is performed after cell placement, allowing more knowledgeable placement of power structures in the physical layout. By performing cell placement prior to power routing, standard cells are allowed to be placed in more optimal configurations. In one embodiment, power rings and power straps are placed over the top of the standard cells based on power analysis of the standard cell layout. Those regions of the layout where design violations are triggered are corrected by an incremental placement correction of affected cells. In another embodiment, cells are placed in the physical layout in a bottom-up hierarchical manner. When a given cell becomes large enough to require power routing, a power feed cell of sufficient dimension to support the necessary power strap is inserted into the circuit layout during the placement process. In the subsequent power routing phase, power straps are placed over the power feed cells.

DETAILED DESCRIPTION OF THE INVENTION

The invention is a method and apparatus for performing power routing in ASIC design. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

In one or more embodiments of the invention, power routing is performed subsequent to cell placement, in contrast to prior art power routing schemes. More intelligent routing of power resources is achieved based on actual placement of cell structures and expected power requirements. Further, more optimal cell placement is achieved in the absence of power-based placement obstacles.

In on embodiment, an incremental placement correction phase is implemented to correct any violations caused by routing of power straps over existing cells. In another embodiment, a standard cell is inserted into the cell placement process to provide one or more paths within the physical layout for subsequent power routing. These embodiments are described in detail below.

Embodiment with Incremental Correction

Figure 1:
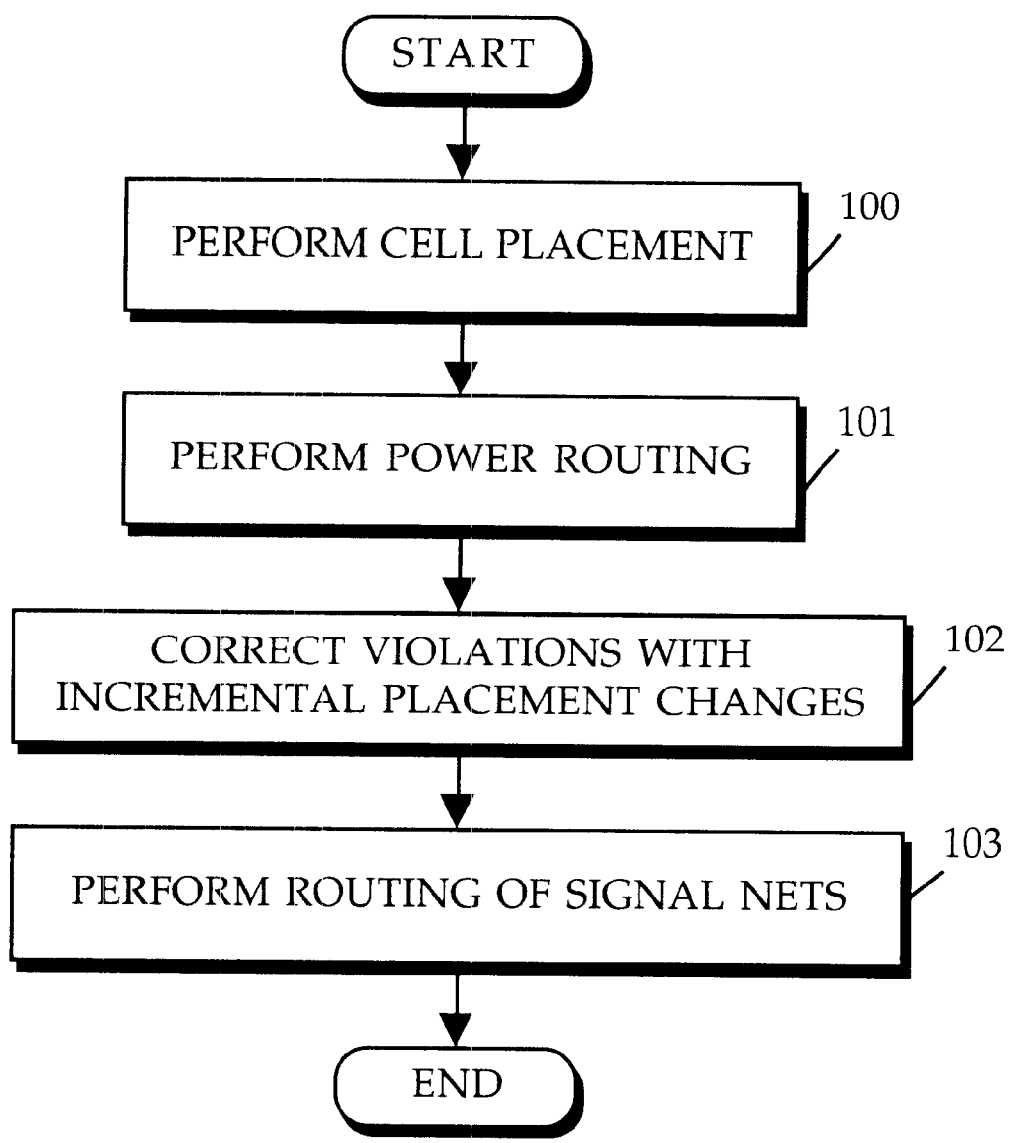
FIG. 1 is a flow diagram of a method for generating a physical circuit layout in accordance with an embodiment of the invention.

FIG. 1 is a flow diagram illustrating a method for generating a physical circuit layout in accordance with an embodiment of the invention. It will be obvious that further steps (e.g., design rule checking, extraction of parasitics for simulation, etc.) may be implemented without departing from the scope of the invention. Further, each step discussed herein may be implemented as one or more constituent sub-steps.

In step 100 of FIG. 1, cell placement is performed, e.g., in a hierarchical bottom-up manner. For example, consider an 8×8 memory array module that comprises eight vertically aligned 1×8 memory modules. Each of those 1×8 memory modules further comprises eight horizontally aligned one-bit memory cells. For placement, a one-bit memory cell is initially placed (e.g., defining the cell's basic orientation and dimensions). Next, a 1×8 memory module is placed, incorporating the previous general placement of the one-bit memory cell to place the eight component one-bit memory cells. The 8×8 memory array module incorporates, in turn, the general placement of the 1×8 memory module for placement of its vertically aligned components. Thus, more and more cells are processed from the bottom up, until all elements of the design have been placed. Because there are no power resources to be avoided in the placement process, an optimal placement can be performed easily and quickly.

In step 101, power routing is performed to place power resources, such as power buses, rings and straps, within the layout. Because power routing follows the placement phase, power consumption can be analyzed in a known manner based on the standard cell placement. Power buses can be planned and distributed according to the power consumption map obtained from the power analysis. Unlike the prior art where conservative power assumptions are made, power routing is able to address the power needs of the layout more accurately and aggressively.

Because placement occurs without reference to power routing, it is likely that design violations will occur in the power routing phase due to metal overlaps between power buses or straps and standard cells. For this reason, in step 102, an incremental placement phase is implemented to correct such violations. The incremental placement nudges the placement of overlapped cells away from the offending power resource until the violation no longer exists. Modest shifts of standard cells are thus carried out to make room for the power resources. In step 103, the signal nets of the standard cells are routed to complete the circuit layout.

Figure 2A:
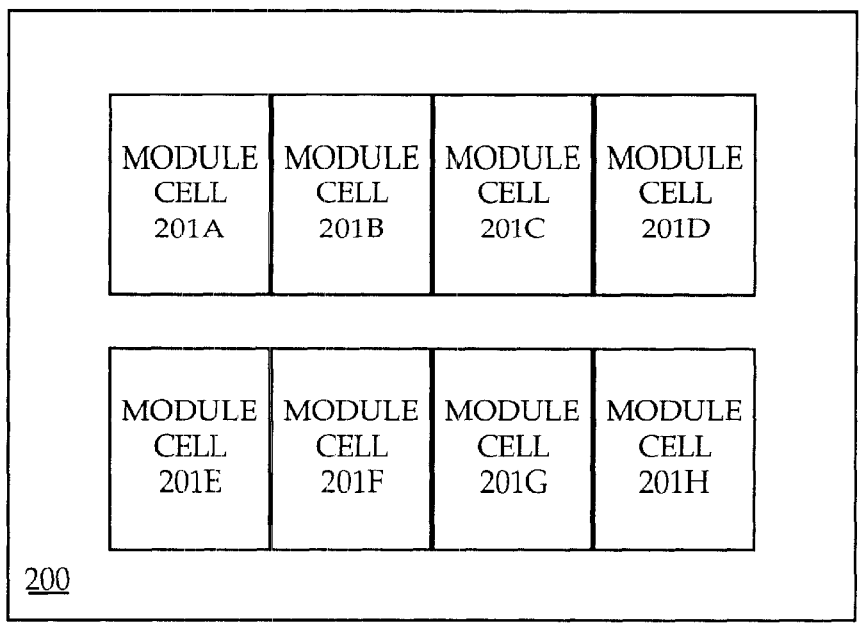
FIG. 2A is a diagram illustrating placement of standard cells in accordance with an embodiment of the invention.
Figure 2B:
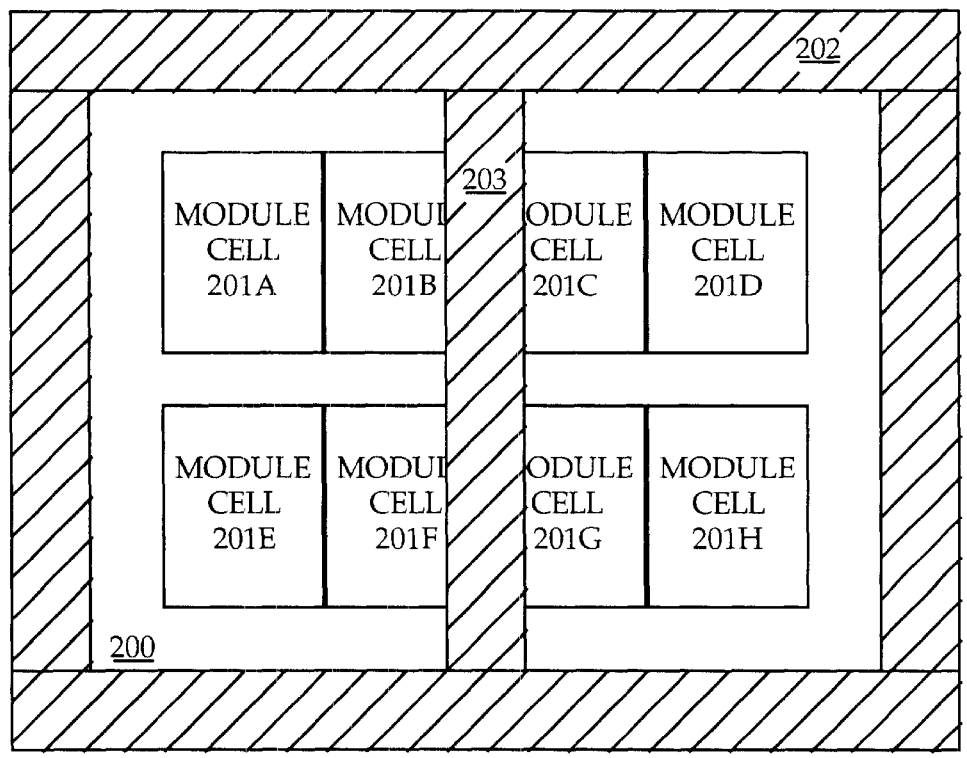
FIG. 2B is a diagram illustrating routing of a power ring and power strap over standard cells in accordance with an embodiment of the invention.
Figure 2C:
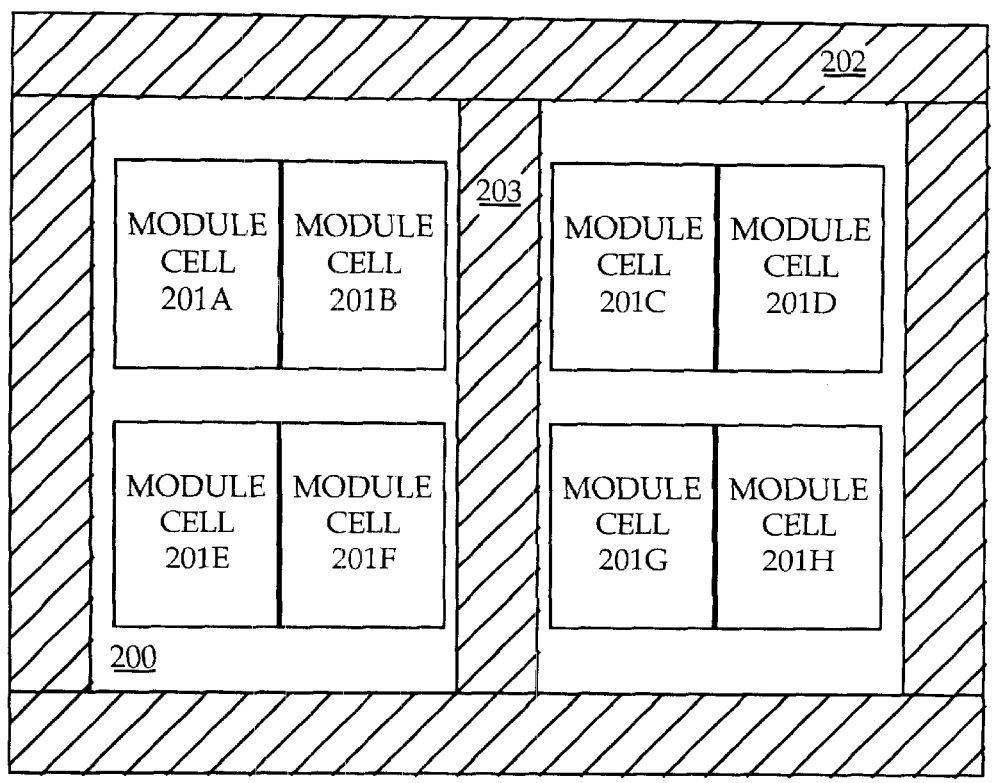
FIG. 2C is a diagram illustrating a corrected placement of standard cells from FIG. 2B in accordance with an embodiment of the invention.

FIGS. 2A–2C illustrate the generation of a physical layout in accordance with an embodiment of the invention. FIGS. 2A, 2B and 2C correspond to the placement phase, power routing phase, and correction phases, respectively. FIG. 2A illustrates a module 200 comprising optimally placed standard cells 201A–201H in two rows of four cells. In FIG. 2B, a power routing process is performed that results in the placement of a power ring 202 around module 200, and a power strap 203 that vertically spans cell 200. As shown, power strap 203 overlaps module cells 201B–C and 201F–G in what would be flagged as a design violation.

Incremental correction involves translating, by a small amount, one or more module cells in the vicinity of a flagged design violation. In FIG. 2C, module cells 201A–201B and 201E–201F are incrementally nudged to the left to the point where the violations with respect to module cells 201B and 201F are removed. Similarly, module cells 201C–201D and 201G–201H are nudged incrementally to the right to the point that the violations with respect to module cells 201C and 201G are removed. A substantially optimal placement of cells remains with well routed power resources. Thus, power routing is accomplished in accordance with one embodiment of the invention.

Embodiment with Power Feed Cells

Figure 3:
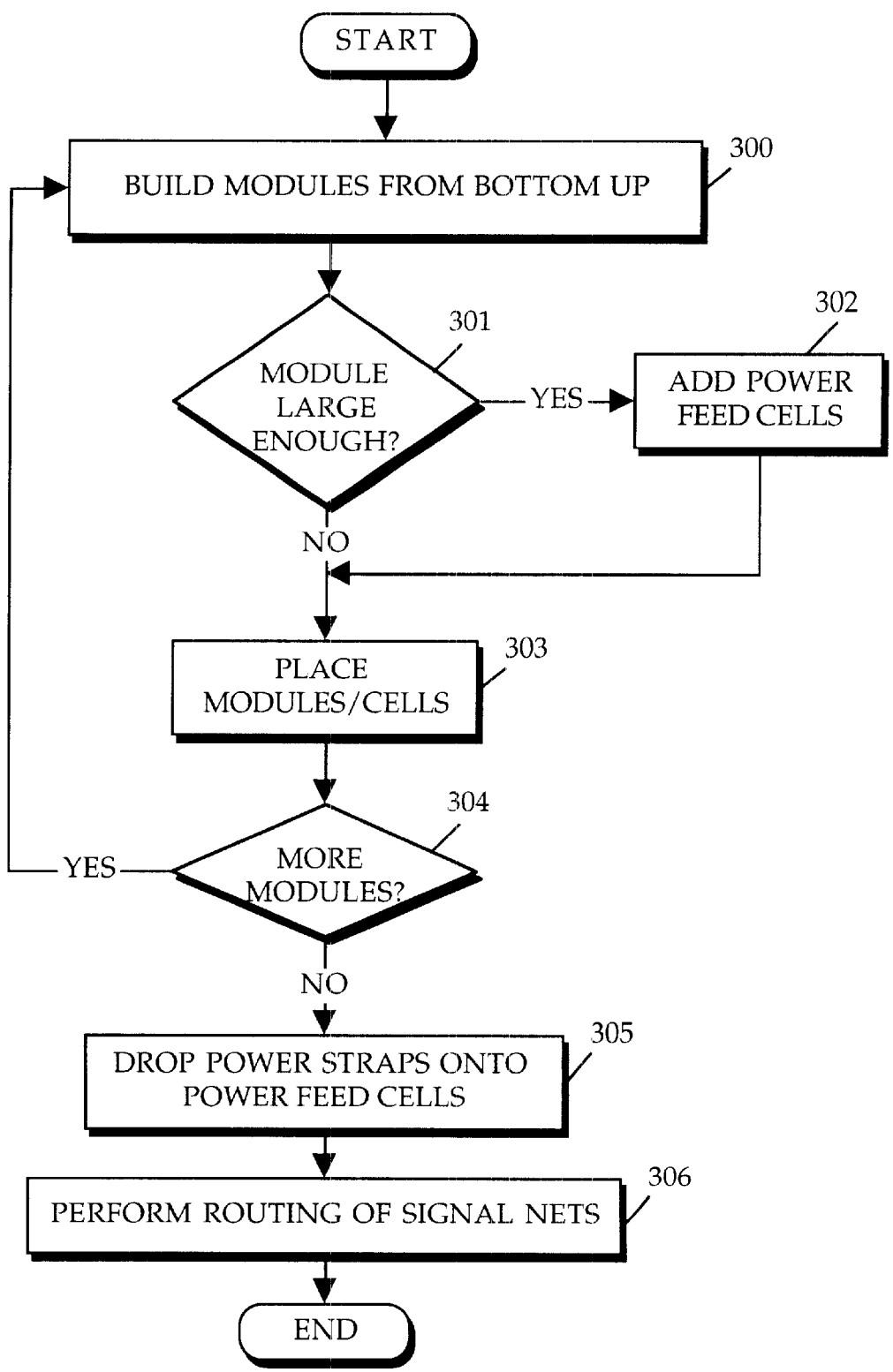
FIG. 3 is a flow diagram of a method for hierarchically generating a physical circuit layout in accordance with an embodiment of the invention.

FIG. 3 is a flow diagram illustrating a method for generation of a layout in accordance with one or more embodiments of the invention. The method of FIG. 3 provides a mechanism whereby power routing is optimally facilitated during the placement phase through the introduction of empty standard cell blocks configured to support the dimensions of a power strap. These empty cells, referred to herein as power feed cells, are inserted as needed into the standard cell layout to provide channels for later power routing.

In step 300, the modules of a given circuit design are built (e.g., synthesized and placed), with, for example, one or more current modules being used to form larger subsequent modules, which may then be used in a later iteration to form even larger modules, and so on (herein referred to as building "from the bottom up "). As modules are built and placed, in step 301, it is determined whether the current module is large enough to require power routing. For example, the current module contains a number of cells or modules having sufficient power consumption to merit having a local power strap or bus within the current module. If the current module is large enough to merit a power strap, or other power resource, in step 302, a power feed cell is inserted into the current module. The dimensions of the power feed cell are selected to provide a sufficient area for a power strap to cross without incurring a design violation with other nearby cells. In step 303, the current module, including any inserted power feed cell, is placed in the physical design layout. Where a plurality of modules are placed, any power feed cells therein may be aligned to provide a path for power straps in the power routing phase. If there are more modules to build and place, step 304 branches back to step 300 to process the next module.

If, in step 304, there are no further modules, indicating that the placement phase is complete, the method continues at step 305. In step 305, power routing is performed, such as by dropping power straps onto the physical layout to overlay any power feed cells in the layout. Because the power feed cells act as place holders for the power straps, violations due to overlap of power straps on other cells are eliminated. In step 306, routing is performed for the signal nets of the standard cells in the layout before the method completes.

Figure 4A:
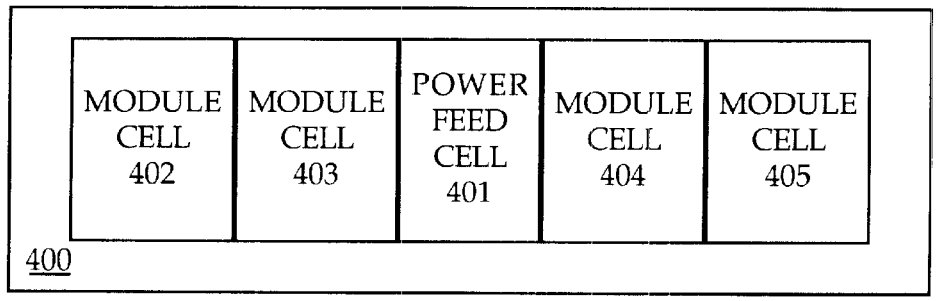
FIG. 4A is a diagram illustrating placement of a power feed cell in a standard cell module in accordance with an embodiment of the invention.
Figure 4B:
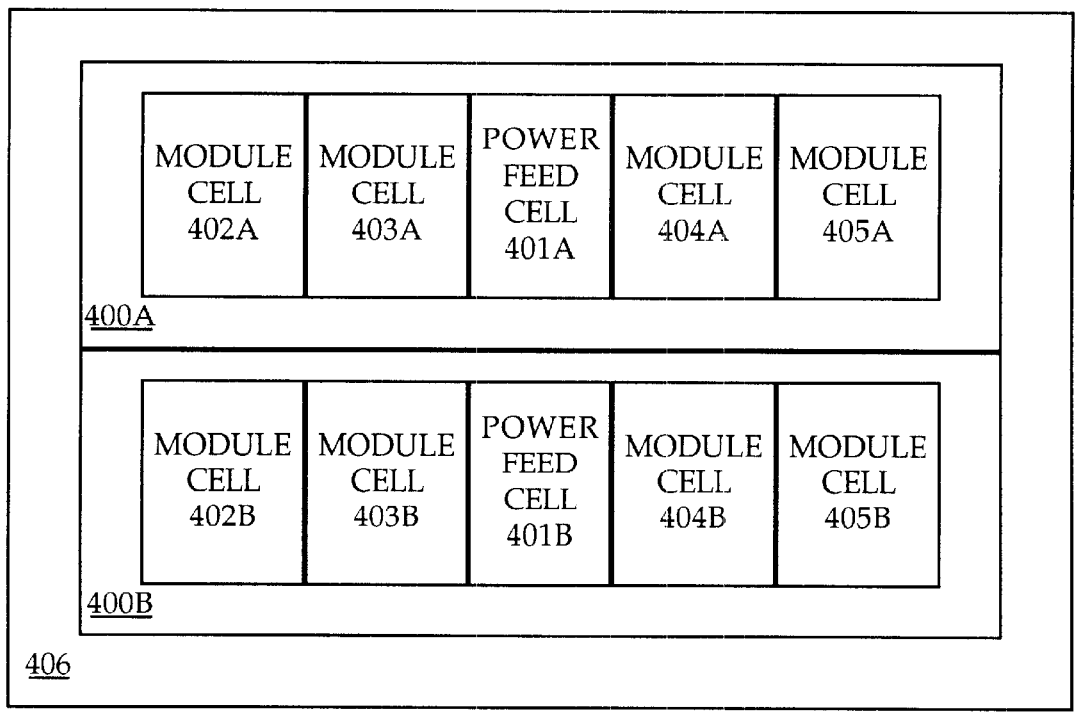
FIG. 4B is a diagram illustrating building of a module from the standard cells of FIG. 4A in accordance with an embodiment of the invention.
Figure 4C:
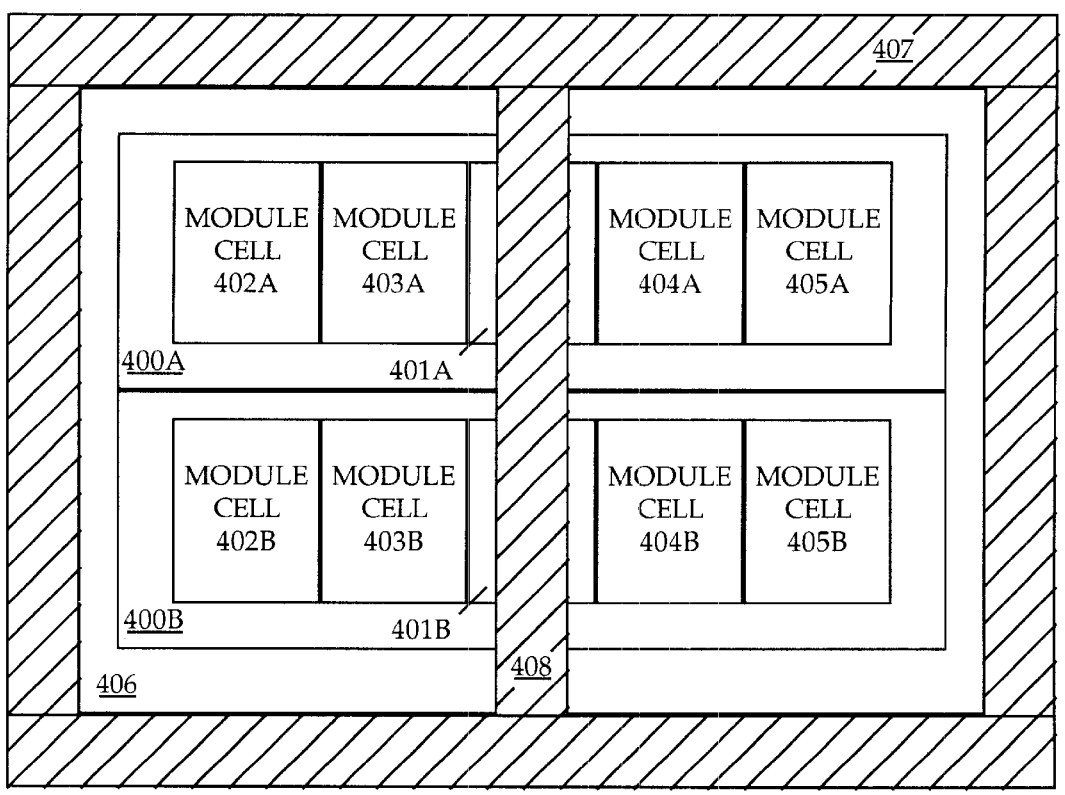
FIG. 4C is a diagram illustrating routing of a power ring and power strap in accordance with an embodiment of the invention.

FIGS. 4A–4C illustrate the generation of a physical layout in accordance with an embodiment of the invention. FIG. 4A shows the layout placement of a module 400 comprising module cells 402–405. An inserted power feed cell 401 is centrally aligned with respect to module 400 and substantially spans module 400 in the vertical direction (a common orientation for power straps in ASIC designs). Two instances of module 400 of FIG. 4A (instances 400A and 400B) are placed in FIG. 4B to form new module 406. As shown, module instances 400A and 400B are aligned such that respective power feed cells 401A and 401B are vertically aligned. Thus, a centralized vertical channel comprising power feed cells 401A–B is maintained in the physical layout.

FIG. 4C illustrates module 406 of FIG. 4B after power routing has been performed. In the example shown, a power ring 407 is placed on the bounds of module 406. Further, in accordance with an embodiment of the invention, power strap 408 is routed along the channel formed by power feed cells 401A–B. Thus, the power consumption needs of module 406 are met by efficient power routing, while optimized placement of standard cells is achieved prior to the power routing phase.

Embodiment of Computer Execution Environment (Hardware)

Figure 5:
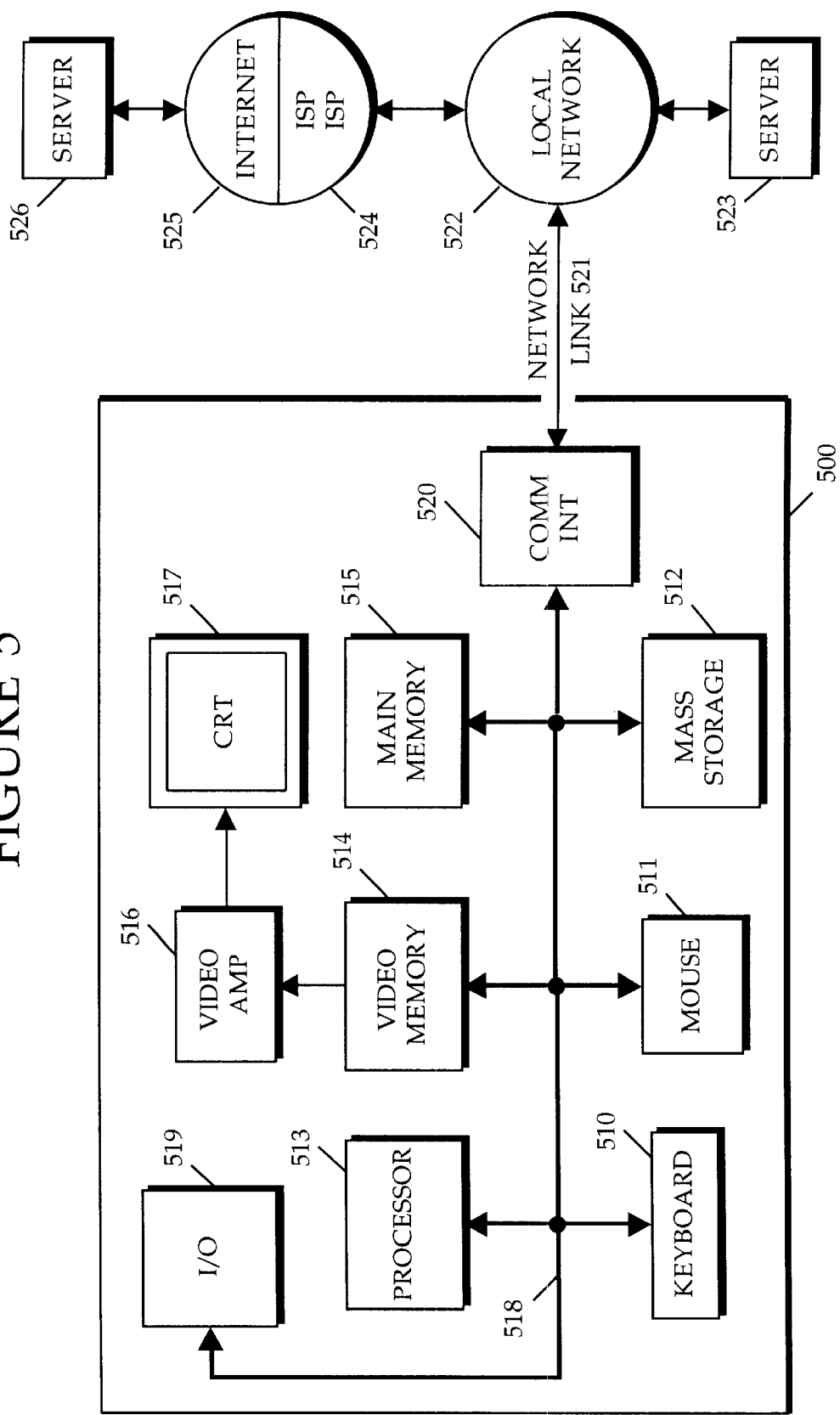
FIG. 5 is a block diagram of a computer system in which systems consistent with the principles of the invention may be implemented.

An embodiment of the invention can be implemented as computer software in the form of computer readable code executed on a general purpose computer such as computer 500 illustrated in FIG. 5, or in the form of programs or class files executable within a runtime environment (e.g., the Java™ Runtime Environment) running on such a computer. The computer systems described below are for purposes of example only. An embodiment of the invention may be implemented in any type of computer system or programming or processing environment, including "thin " client processing environments (e.g., network computers (NC's), etc.).

In FIG. 5, a keyboard 510 and mouse 511 are coupled to a system bus 518. The keyboard and mouse are for introducing user input to the computer system and communicating that user input to processor 513. Other suitable input devices may be used in addition to, or in place of, the mouse 511 and keyboard 510. I/O (input/output) unit 519 coupled to system bus 518 represents such I/O elements as a printer, A/V (audio/video) I/O, etc.

Computer 500 includes a video memory 514, main memory 515 and mass storage 512, all coupled to system bus 518 along with keyboard 510, mouse 511 and processor 513. The mass storage 512 may include both fixed and removable media, such as magnetic, optical or magnetic optical storage systems or any other available mass storage technology. Bus 518 may contain, for example, address lines for addressing video memory 514 or main memory 515. The system bus 518 also includes, for example, a data bus for transferring data between and among the components, such as processor 513, main memory 515, video memory 514 and mass storage 512. Alternatively, multiplex data/address lines may be used instead of separate data and address lines.

In one embodiment of the invention, the processor 513 is a SPARC™ microprocessor from Sun Microsystems, Inc., or a microprocessor manufactured by Motorola, such as the 680×0 processor, or a microprocessor manufactured by Intel, such as the 80×86, or Pentium processor. However, any other suitable microprocessor or microcomputer may be utilized. Main memory 515 is comprised of dynamic random access memory (DRAM). Video memory 514 is a dual-ported video random access memory. One port of the video memory 514 is coupled to video amplifier 516. The video amplifier 516 is used to drive the cathode ray tube (CRT) raster monitor 517. Video amplifier 516 is well known in the art and may be implemented by any suitable apparatus. This circuitry converts pixel data stored in video memory 514 to a raster signal suitable for use by monitor 517. Monitor 517 is a type of monitor suitable for displaying graphic images. Alternatively, the video memory could be used to drive a flat panel or liquid crystal display (LCD), or any other suitable data presentation device.

Computer 500 may also include a communication interface 520 coupled to bus 518. Communication interface 520 provides a two-way data communication coupling via a network link 521 to a local network 522. For example, if communication interface 520 is an integrated services digital network (ISDN) card or a modem, communication interface 520 provides a data communication connection to the corresponding type of telephone line, which comprises part of network link 521. If communication interface 520 is a local area network (LAN) card, communication interface 520 provides a data communication connection via network link 521 to a compatible LAN. Communication interface 520 could also be a cable modem or wireless interface. In any such implementation, communication interface 520 sends and receives electrical, electromagnetic or optical signals which carry digital data streams representing various types of information.

Network link 521 typically provides data communication through one or more networks to other data devices. For example, network link 521 may provide a connection through local network 522 to local server computer 523 or to data equipment operated by an Internet Service Provider (ISP) 524. ISP 524 in turn provides data communication services through the world wide packet data communication network now commonly referred to as the "Internet" 525. Local network 522 and Internet 525 both use electrical, electromagnetic or optical signals which carry digital data streams. The signals through the various networks and the signals on network link 521 and through communication interface 520, which carry the digital data to and from computer 500, are exemplary forms of carrier waves transporting the information.

Computer 500 can send messages and receive data, including program code, through the network(s), network link 521, and communication interface 520. In the Internet example, remote server computer 526 might transmit a requested code for an application program through Internet 525, ISP 524, local network 522 and communication interface 520.

The received code may be executed by processor 513 as it is received, and/or stored in mass storage 512, or other non-volatile storage for later execution. In this manner, computer 500 may obtain application code in the form of a carrier wave. In accordance with an embodiment of the invention, an example of such a downloaded application is the apparatus for performing power routing described herein.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, servers on a network, and carrier waves.

Thus, a method and apparatus for performing power routing in ASIC design have been described in conjunction with one or more specific embodiments. The invention is defined by the claims and their full scope of equivalents.

What is claimed is:

1. In a computer system, a method comprising:
   performing placement of one or more standard cells to obtain a physical layout; and
   after said placement, routing one or more power resources across said physical layout, wherein routing said one or more power resources comprises analyzing power consumption of said physical layout to determine where said one or more power resources are to be routed.

2. The method of claim 1, further comprising performing an incremental placement correction to correct one or more design rule violations associated with routing said one or more power resources.

3. The method of claim 1, wherein performing placement of said one or more standard cells further comprises inserting an empty cell in said physical layout.

4. The method of claim 3, wherein inserting said empty cell further comprises determining if a current cell merits a power resource.

5. The method of claim 3, wherein routing said one or more power resources further comprises routing a power strap across said empty cell.

6. A computer program product comprising:
   a computer readable medium having computer program code embodied therein for building a circuit, the computer readable medium comprising computer program code configured to cause a computer to:
   perform placement of one or more standard cells to obtain a physical layout; and
   after said placement, route one or more power resources across said physical layout, wherein routing said one or more power resources comprises analyzing power consumption of said physical layout to determine where said one or more power resources are to be routed.

7. The computer program product of claim 6, wherein said computer program code is further configured to perform an incremental placement correction to correct one or more design rule violations associated with routing said one or more power resources.

8. The computer program product of claim 6, wherein performing placement of said one or more standard cells further comprises inserting an empty cell in said physical layout.

9. The computer program product of claim 8, wherein inserting said empty cell further comprises determining if a current cell merits a power resource.

10. The computer program product of claim 8, wherein routing said one or more power resources further comprises routing a power strap across said empty cell.

11. In a computer system, an apparatus comprising:
    a processor;
    a process executing on said processor, said process configured to:
    obtain a physical layout through placement of one or more standard cells;
    analyze power consumption of said physical layout to determine where one or more power resources are to be routed; and
    route said one or more power resources across said physical layout after said placement.

12. The apparatus of claim 11, wherein said process is further configured to perform an incremental placement correction to correct one or more design rule violations associated with routing said one or more power resources.

13. The apparatus of claim 11, wherein said process is further configured to insert an empty cell in said physical layout.

14. The apparatus of claim 13, wherein inserting said empty cell further comprises determining if a current cell merits a power resource.

15. The apparatus of claim 13, wherein said process is further configured to route a power strap across said empty cell.

16. In a computer system, an apparatus comprising:
    means for performing placement of one or more standard cells to obtain a physical layout;

means for analyzing said physical layout to determine power routing requirements; and means for routing one or more power resources across said physical layout after said placement.

17. An integrated circuit having elements defined by a physical layout, said integrated circuit comprising:

one or more empty cells automatically inserted into said physical layout by a computer process, based on an analysis of power consumption of said physical layout;

one or more power resources routed across said one or more empty cells.

18. In a computer system, a method comprising:

performing placement of a plurality of cells to obtain a physical layout;

after said placement:
  analyzing said physical layout to determine power routing requirements;
  routing one or more power resources across said physical layout in accordance with said power routing requirements; and
  incrementally translating one or more of said plurality of cells to correct one or more design rule violations associated with said one or more power resources.

19. In a computer system, a method comprising:

performing placement of a plurality of cells in a current circuit module;

determining if said current circuit module merits a power resource;

if said current circuit module requires a power resource, inserting one or more substantially empty cells in said circuit module;

after placement of a physical layout comprising said current circuit module, routing one or more power resources over said one or more substantially empty cells.

20. The method of claim 19, further comprising:

placing a plurality of modules in said physical layout, wherein at least one substantially empty cell of a first module is aligned with at least one substantially empty cell of a second module.

* * * * *